United States Patent
Carey et al.

(12) 
(10) Patent No.: US 6,396,770 B1
(45) Date of Patent: May 28, 2002

(54) STEERABLE THERMOACOUSTIC ARRAY

(75) Inventors: Charles A. Carey, Burlington, MA (US); Harvey C. Woodsum, Nashua, NH (US); Richard A. Jensen, Andover, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 06/392,182

(22) Filed: Jun. 28, 1982

(51) Int. Cl.$^7$ .................................................. H04R 1/44
(52) U.S. Cl. ...................................................... 367/141
(58) Field of Search ........................ 181/0.5, 142, 109, 181/113; 340/850; 356/5; 367/87, 103, 142, 131, 134, 137, 138, 149–141

(56) References Cited

U.S. PATENT DOCUMENTS

| | | | | |
|---|---|---|---|---|
| 3,220,504 A | * | 11/1965 | Parrack ....................... | 181/109 |
| 3,230,506 A | * | 1/1966 | Hellund ....................... | 367/147 |
| 3,278,753 A | * | 10/1966 | Pitts et al. ................... | 340/850 |
| 3,392,368 A | * | 7/1968 | Brewer et al. ............... | 367/142 |
| 3,913,060 A | * | 10/1975 | Westervelt et al. .......... | 367/137 |
| 4,050,819 A | * | 9/1977 | Lichtman ..................... | 340/850 |

FOREIGN PATENT DOCUMENTS

DE       2707933       * 8/1978 ................. 367/138

OTHER PUBLICATIONS

Gournay, J. Acous. Soc. Amer., vol. 40, No. 6, 1966, pp. 1322–1330.*

* cited by examiner

Primary Examiner—Daniel T. Pihulic
(74) Attorney, Agent, or Firm—Vernon C. Maine; Scott J. Asmus

(57) ABSTRACT

This invention is a steerable thermoacoustic array system for directing information between an object that is above the surface of the water and a sound detector that is beneath the surface of the water. The foregoing system comprises a laser or particle accelerator that is located above the water's surface. The laser or particle beam produces a light beam or particle beam which contains information that is moved along a small layer of water at the air/water interface at a speed equal to the speed of sound in water divided by the steering angle of the laser so that the light beam or particle beam is absorbed by the water causing the water to expand and produce a series of acousitic Braves that constructively interfere with each other and travel towards the sound detector.

12 Claims, 2 Drawing Sheets

STEERABLE THERMOACOUSTIC ARRAY

CROOS REFERENCE TO RELATED APPLICATIONS

Reference is made to the following concurrently filed and related patent applications which are assigned to the present assignee:

1. D-3735 entitled "Thermoacoustic Torpedo Jammer" Ser. No. 06/392,184, filed Jun. 28, 1982; now abandoned
2. D-3736 entitled "Thermoacoustic Bistatic Sonar System" Ser. No. 06/392,183, filed Jun. 28, 1982; now abandoned
3. D-3737 entitled "Thermoacoustic Communications System" Ser. No. 06/392,186, filed Jun. 28, 1982.

FIELD OF THE INVENTION

This invention relates to systems for the generation of acoustic signals and more particularly to the generation of Steerable Thermoacoustic Signals using thermoacoustic effects.

BACKGROUND OF THE INVENTION

A submarine is a ship that can operate both on the surface of the water and completely submerged. In order to avoid detection by radar, surface ships and air patrol, a submarine is usually submerged. Modern submarines have the capability of remaining submerged for long periods of time. In fact, a modern submarine can circumnavigate the earth while running submerged. Thus, modern submarines may complete large portions of their missions while being submerged.

Occasionally, while the submarine is submerged, an airborne vehicle may want to communicate with the submarine. Prior art communications systems used buoys. The airborne vehicle dropped a buoy into the water and the submarine either surfaced to receive the message from the buoy (the message was transmitted to the buoy on an RF Frequency) or the airborne vehicle communicated with the buoy on an RF Frequency and the buoy emitted a sound wave which propagated through the water. The submarine would detect the aforementioned sound waves with sound detection systems like sonar. One buoy would produce omnidirectional sound and directional sound was needed for good communications and detection. The prior art produced directional sound by utilizing an array of buoys which were dropped in the water by an airborne vehicle. The buoys were precisely spaced in the water and beamforming equipment was used to properly phase the beam. Some of the disadvantages of the foregoing systems were that: the buoys had to be carried by an aircraft and the buoys would require space aboard the vehicle and add to the weight of the aircraft, which would reduce the amount of other equipment the aircraft would carry and/or reduce the aircraft's range; the buoys might be detected by a foreign power and disclose the relative location of the submarine; the buoys had a limited range and as the submarine proceeded on its mission the submarine might travel away from the buoy, necessitating the dropping of another array of buoys so that the transmission between the aircraft and the submarine might be continued; the buoys used an active transducer to convert the signals it received from the airborne vehicle into acoustic noise (the acoustic noise levels were high, which is undesirable from a covertness standpoint); the buoys required beamforming equipment; and the buoys were expendable, which meant that the transmission of a message to a submarine was relatively expensive.

Another method utilized by the prior art for the transmission of messages between an airborne vehicle and a submarine employed the use of a very low frequency antenna. The airborne vehicle would extend a low frequency antenna from its fuselage. This method proved to be disadvantageous, since it changed the performance characteristics of the aircraft and made the aircraft less maneuverable. Furthermore, low frequency antennas were not capable of being installed aboard all types of airborne vehicles.

SUMMARY OF THE INVENTION

This invention overcomes the disadvantages of the prior art by creating a Steerable Thermoacoustic Array that is completely mobile by having its transmission equipment aboard an airborne or spaceborne platform and its receiving equipment aboard a device that operates underwater, e.g., submarine, torpedo, mine, underwater oil exploration equipment, etc. The laser or particle beam that is used to produce thermoacoustic signals is steered so that a beam will be produced which traces a path along the water at speed $C_\theta/\sin \theta$ where $C_\theta$ is the speed of sound in water and $\sin \theta$ is the steering angle. Thus, the foregoing system produces directional signals without any expendable components or easily detectable components that float on the surface of the water. Furthermore, since the receiving equipment can function underwater, a submarine would not have to interrupt its mission (surface) to receive a message from an airborne vehicle or satellite.

The apparatus of this invention achieves the above by utilizing the direct conversion of EM or particle kinetic energy into acoustic energy. The foregoing is accomplished by using either a pulsed infrared wavelength laser or particle beam which is fired into the water from an aircraft or satellite. The physical mechanisms producing sound are of two kinds: (1) thermal expansion of the water from heat generated by medium attenuation of a pulse of laser light or impinging particles, or (2) explosive vaporization of a small volume of water when the heat deposited by the laser or particle beam is large enough to raise the local water temperature above boiling threshold. Infrared laser light is usually used because of its high attenuation coefficient in water which causes high thermal densities. The level of sound produced by infrared lasers is sufficient for communications at expected ranges of communication buoys. Infrared lasers may be controlled (modulated) to the extent required for an underwater communications system. Typical data rates are ~1–10 bits per second.

Modulation schemes which may be employed are on-off keying (OOK), pulse duration modulation (PDM), pulse amplitude modulation (PAM), and frequency shift keying (FSK). The foregoing modulation schemes may be used for lasers and particle beams.

When the density of the heat energy deposited by laser beam absorption is less than that required to vaporize a local volume of water (~2500 joules/cm$^3$) the acoustic pressure at radial distance R and polar angle θ from the beam impact point at the water surface is given by the following expression:

$$P(R, T, \theta) = \frac{k}{2\pi} \int_{-\infty}^{+\infty} d\omega M(\omega)\omega^2 \exp[-j(\omega t - R/c_o)] \cdot \sin\theta$$

where $k=\beta I_o/(4\pi R c_o C_p)$
  $C_o$=speed of sound
  $C_p$=specific heat of water
  $I_o$=laser power output
  t=time
  β=thermal expansion coefficient of water Here $M(\omega)$ is the Fourier transform of the modulation, and $I_o$ the laser power output prior to modulation. The above expression assumes that the useful portion of the acoustic signal is transmitted at a frequency with wavelength smaller than either the beam spot size or absorption depth.

If the modulation is a gaussian pulse $$M(t) = \frac{M_o}{\sqrt{2\pi}\sigma_t}\exp[-t^2/\sigma_t^2]$$

where $\sigma_t$=(one-half of the laser pulse width). The Fourier transform of $P(R,\theta)$ is proportional to the function $F(\omega)=\omega^2 \exp[-\omega^2\sigma_t^2]$. The frequency $(\omega)_p$ when the spectral energy is the acoustic pulse peak is $$\omega_p = \frac{1}{\sqrt{3}}\sigma_t^{-1}$$

as can be found by setting the derivative of $F(\omega)$ equal to zero.

Thus, the duration of the laser pulse $(2\sigma_t)$ controls the spectral $W_p$. The bandwidth of the signal can be controlled by firing the laser a number of times at a repetition interval less than or equal to the duration of an acoustic pulse produced by a single laser pulse, or by simply lengthening the pulse duration for a single pulse. The pulse amplitude may be controlled and varied by changing the laser power output.

The extremely short 1–10μ absorption length for certain infrared light frequencies in water makes an explosive vaporization mode of thermoacoustic generation attractive. Incident light with a fluence of >3 J/cm² ($E_T$) at 10μ wavelength, for instance, will instantaneously boil the 10 micron layer in which most of the light is absorbed. This rapid vaporization produces an explosive stress or shock wave (with Fourier transform $S(\omega)$) which eventually propagates through the water as a soundwave (with Fourier transform proportional to $\omega S(\omega)$). The internal energy (E) contained in the gas that was vaporized is approximately given by the ideal gas state equation:

$$E = \frac{3}{2}PV$$

where E is the difference between the laser energy and the energy required to boil the thin layer of water. The initial pressure in the gas bubble would be approximately given by $$P_o = \frac{2}{3}\frac{(E_o - E_T)}{V}$$

where:
  $E_o$=laser pulse energy
  $E_T$=Threshold for vaporization
  V=Volume of fluid in which absorption of light occurs
  V≅Aδ=(spot area)×(laser light absorption depth)
Reasonable values for the spot area (A) and absorption lengths are:

A=spot area=1CM²=$10^{-4}$m²
  δ=absorption length of fluid=$10^{-5}$m at $CO_2$ laser wavelengths The determination of allowable communication path length requires a knowledge of the spectral level and distribution of the acoustic energy represented by the source strength given above. The duration of the time domain pulse resulting from explosive vaporization of the water surface layer must be estimated to obtain its spectral distribution. Assume the laser pulse is sufficiently short ($\leq 10^{-6}$ sec.) so that all the laser energy is absorbed before the explosive vaporization has appreciably progressed. The time required to expand the $10^{-9}$m³ volume of water to 1 ATM gaseous phase is roughly one-half the width of the acoustic pulse produced. The expanded volume of the water is $10^{-6}$m³ based on the roughly $10^3$ difference in density between liquid water and water vapor at 1 ATM. The vapor bubble expands at roughly Mach two in air (2200 m/sec.) forming a spherical segment of volume ~$10^{-6}$m³. The time for the expansion to take place is T=4.5μsec.

at Mach two. The center frequency of the wideband pulse thus produced is $f_o$=(1/(9μsec))=110 Khz.

The spectrum of the thermoacoustic pulse is a roughly 100% bandwidth pulse centered on fo thus with single pulse on-off coding the signal bandwidth is (BW)=110 KHz.

Taking, for example a 10 joule laser pulse, the peak pressure at the surface is $$P_s = \frac{2}{3}\frac{(E_o - E_T)}{A\delta}$$

$$P_s = \frac{2}{3}\frac{(10-3)}{(10^{-4})(10^{-5})}$$

or 316 dB relative to 1μ Pa (rel/μPa) Assuming spherical spreading from an initial radius ($R_o$) of the source, the source strength at a range R is $$P(R) = P_o\frac{(R_o)}{R}f(\theta)$$

where θ is the horizontal propagation angle, and f(θ) is the source directivity (≈sinθ). The initial radius can be taken as $V^{1/3}$ where V=$10^{-6}$m³ so that $R_o$=$10^{-2}$m. The resulting source strength at 1 meter below the beam impact point (sinθ=1) is then SL=20 log P(1)=293–20 log $10^4$ or SL=213 dB re (1μPa)

The standard sonar equation can be used to estimate the excess signal at a distance r meters from the source. In the above example, the spectrum of the acoustic signal is approximately linear with frequency for $\omega<\omega_p$. Thus, the spectrum level (dB//Hz) at 10 KHz (our assumed transmit frequency) is 20 dB below that at 110 KHz. The spectrum level for θ=π/2 rad. at 110 KHz is about 213 dB–10 log (1.1×$10^5$ Hz)=163 dB//Hz. Therefore, the acoustic spectrum level at 10 KHz≈143 dB//Hz. The sonar equation is inverted to give Figure of Merit (maximum propagation loss) for good communication reliability. This yields (Figure of Merit) FOM=143−45−12=86 dB=source spectrum level—noise spectrum level—threshold.

The signal-to-noise ratio required to reliably communicate is assumed to be 12 dB. The range of the signal pulse on-off keyed communication system described above corresponding to an 86 dB FOM is 6 Kyd. Receiving the signal with a directional receiver will increase this range considerably. A practical system calls for bit rates of the order of 5 bits a second or 50 watts of laser power with 10 joule pulses.

An alternate use of the laser energy would be to fire the laser every τ sec to obtain a more narrowband acoustic wave train centered on $\tau^{-1}$. For instance, a ten cycle burst at the same laser power per pulse (10J) cited above would require 100 joules. The bandwidth would be 11,000 Hz. Thus, if coherent detection could be used, an extra 10 dB of transmission loss could be tolerated.

A particle beam generates acoustic energy by impacting a small region of the surface of the water at the air/water interface. Energy from the aforementioned beam is absorbed by the water which causes the water to be heated. The heating of the water causes thermal expansion which generates pressure or stresses within the water that propagate through the water as a sound wave. The pressure P produced by the particle beam is given by expressions provided above for the thermoelastic energy case with the power flow in the particle beam replacing the laser power in the formulas.

Thus, by turning the particle beam on and off, a code similar to the one hereinbefore described may be produced because different amounts of energy will be absorbed by the water at different intervals of time causing acoustic signals to be produced which may be received by a sound detector.

The aforementioned beam is omni-directional and the apparatus of this invention produces directional signals by firing the abovementioned laser or particle beam at different locations on the surface of the water at predetermined times. Five beams are normally fired at the water in a given cycle to produce directional thermoacoustic signals. Each of the above beams is a pulse which propagates through the water as a series of disturbances, which look like expanding circles with most of their illumination in the forward direction of wave travel. In order for the beams to constructively interfere with each other in one direction and destructively interfere with each other in the other direction, the beams must be spaced one-half the wave length of sound apart and timed in such a manner that the next pulse is one period of the sound wave later. Thus, the foregoing concentrates the sound in one direction. Hence, if a 100 KHz signal is used, there will be 1000 microseconds between pulses that hit the water. The generation of the above pulses will not be exactly a thousand microseconds apart ($Y_o$), since the speed of the vehicle that the pulse generation equipment is contained in and the angle that the pulses are directed at the water will affect the time between generation of the pulses in accordance with the following equation:

$$\Delta Y = Y_o \cdot (1 - \vec{v} \cdot \hat{r}/C_o)$$

where $\vec{v}$=platform velocity, $C_o$=speed of sound in water, and $\hat{r}$ is a unit vector along the laser (or particle) beam direction.

Only a limited number of signal frequencies will add constructively and destructively in the direction you want the wave to travel. Each frequency travels in a certain direction.

Thus, acoustic waves will travel in a predetermined direction when a 100 KHz frequency is used. The acoustic frequency determines the wave length and spacing between pulses, i.e., frequency equals the speed of sound/λ (the speed of sound is a known quantity that varies with temperature).

By producing a directional beam, the intensity of the signal may be reduced without decreasing the ability to receive the signal. Thus, when the foregoing is used in a sonar application, it is easier to locate the target and when the foregoing is used in a communications application, it is easier to illuminate the area near the receiver.

It is an object of this invention to provide a new and improved Steerable Thermoacoustic Array.

Other objects and advantages of this invention will become more apparent as the following description proceeds, which description should be considered together with the accompanying drawings.

DESCRIPTION OF A PREFERRED EMBODIMENT

Figure 1:
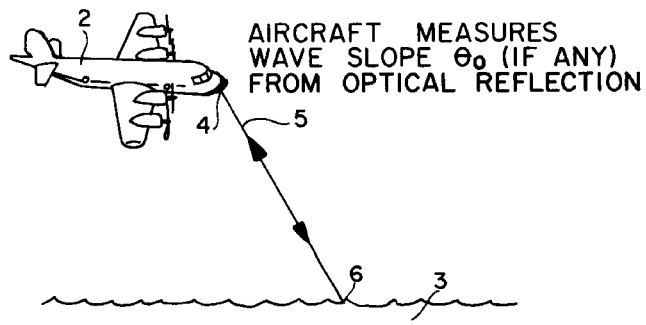
FIG. 1 is a perspective showing the apparatus of this invention being flown aboard an airborne platform directing a beam on the surface of the water so that the beam will be reflected to the airborne platform enabling the slope of the surface waves on the water to be measured.

Referring now to the drawings in detail, and more particularly to FIG. 1, the reference character 2 represents an airborne or spaceborne platform, i.e., airplane, helicopter, satellite, that is flying above the water 3. The apparatus of this invention 4 may be contained within the nose of aircraft 2. Apparatus 4 produces a pulsed electromagnetic or ion beam 5 which is directed at one of a plurality of surface wave 6 which may or may not be on the surface of the water. In calm seas, there may be no waves. Surface wave 6 changes the shape of the surface of water 3 and thus due to back scattering, there will be a change in the direction in which thermoacoustic waves are propagated through the water. Hence, beam 5 is directed and reflected from wave 6 back to aircraft 11 so that the slope $\theta_o$ of wave 6 may be determined and used as a correction factor to remove any error in thermoacoustic wave propagation that was caused by back scattering.

Figure 2:
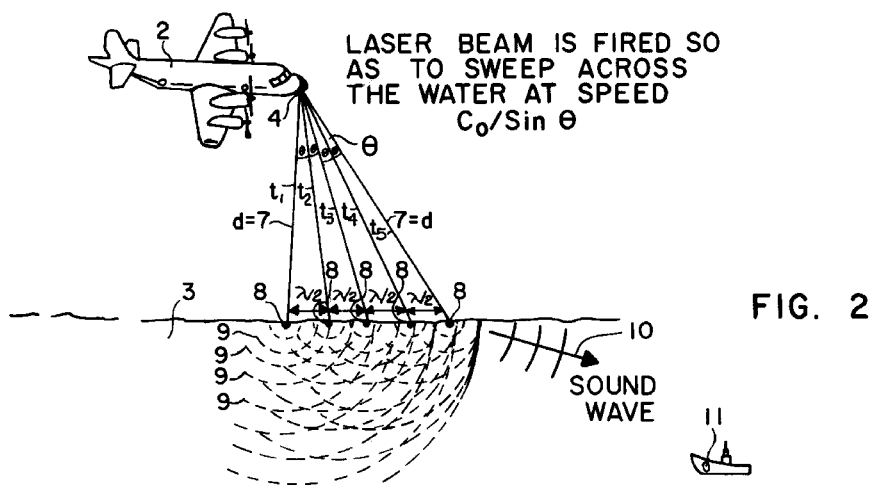
FIG. 2 is a perspective showing the apparatus of this invention being flown aboard an airborne platform and its beam being fired in such a manner so that it sweeps across the water at a speed equal to $C_o$/sin θ.

FIG. 2 s hows the apparatus of this invention 4 being flown aboard airplane 2, that is flying above water 3. Apparatus 4 produces five pulsed electromagnetic or ion beams 7 hereinafter described which are directed at the surface of water 3. Each of the beams 7 will cause approximately a ten micron layer 8 on the surface of water 3 to be heated, causing generation of acoustic signals 9. Signals 9 propagate through the water as a series of disturbances which look like expanding circles. In order for signals 9 to constructively interfere with each other and produce a series of sound waves that travel in the direction shown by vector 10, each of beams 7 must be spaced approximately one-half the wave length of sound apart and fired in such a manner that the next fired beam will hit the surface of water 3 one sound period after the previously fired beam. The steering angle of beam 7 will be represented by angle θ, the distance each beam 7 travels (the altitude of airplane 2) will be represented by d and the speed of sound in water will equal $C_o$. Thus, beam 7 will be fired so as to sweep across water 3 at a speed equal to $C_o/\sin θ$. The time interval between pulses will equal the length of time it takes one of the expanding circles or signals 9 to reach the next expanding circle or signal 9 that was generated by the next beam. Thus, the time interval between respective pulses will equal how long it takes sound to travel λ/2 which equals the period of the sound wave.

Beams 7 contain many different frequencies, however, the apparatus of this invention is constructed in such a manner so that only one of many frequencies of beams 7 (that generates signals 9) will constructively interfere with other signals 9 and travel in direction 10. The frequency of these signals will equal $$\frac{\lambda}{2\,C_O} \sin θ.$$

Signals 9 may be detected by a sound detection receiver 11 that is aboard an underwater vehicle and/or device, i.e., submarine, torpedo, mine, drilling rig, etc. Acoustic signals 9 may also be generated by having beams 5 introduce enough heat into the surface of water 3 so that the water contained at the air/water interface will boil and produce a series of disturbances which are seen as signals 9.

Figure 3:
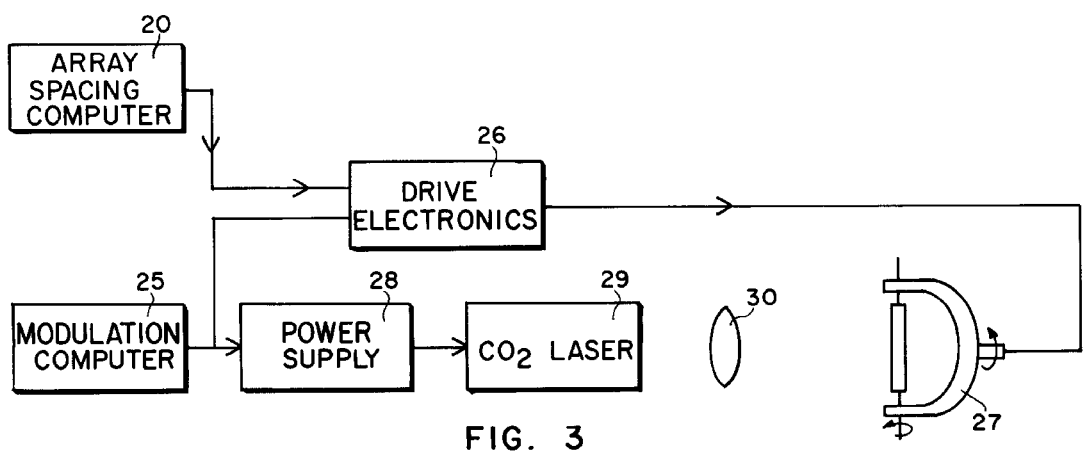
FIG. 3 is a block diagram showing the apparatus of this invention time multiplexing beams that produce acoustic signals.

FIG. 3 shows the apparatus of this invention being used for the generation of a time multiplex code. Modulation computer 25 is coupled to the input of high voltage power supply 28 and drive electronics 26. Array spacing computer 20 is coupled to the input of high voltage power supply 28 and drive electronics 26. The output of drive electronics 26 is coupled to the input of steerable mirror 27. The output of power supply 28 is coupled to the input of $CO_2$ laser 29. A $CO_2$ laser is used for the generation of thermoacoustic signals because of high efficiency (10 to 20 percent); high power and short absorption length (10μ at 10.6 wave length) in water; good propagation through bad weather; small reflection laser at the air water interface and its inability to harm the human eye. Laser 29 is controlled by power supply 28, computer 20 and computer 25. Computers 20 and will turn power supply 28 on and off which, in turn, causes laser 29 to be turned on and off. Thus, every time computers 20 and 25 want laser 29 to have an output, power supply 28 will be turned on to pump laser 29 and conversely, when no input was wanted, power supply 28 would be turned off. Hence, laser 28 is turned on and off in such a manner so that the output of laser 29 will be a series of pulses of varying duration. The aforementioned pulses may be used to generate a binary coded message, i.e., a long pulse may represent a 1 and a short pulse may represent a 0. The pulses are transmitted to steerable mirror 27. Computer 20 controls the spacing between successive beams in the array, i.e., it determines the sweep of the beams so that a thermoacoustic signal will be propagated in a given direction. Computer 25 modulates or determines the message that is transmitted by each of beams 7 (not shown) by modulating the pulse of the aforementioned beams. Mirror 27 is controlled by electronics 26 and computer 25 so that the pulses may be directed to lens 30. Lens 30 focuses the aforementioned laser pulse on the surface of the water where the heat of the laser pulses will cause the generation of an acoustic signal by causing a small layer of water at the water/air interface to expand or boil. This acoustic signal may be detected by an underwater receiver.

Figure 4:
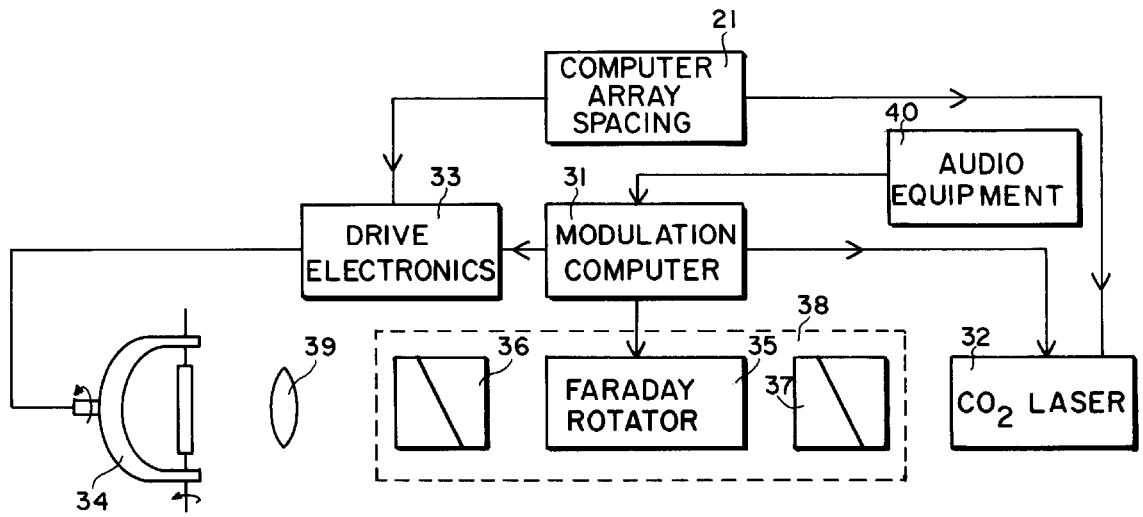
FIG. 4 is a block diagram showing the apparatus of this invention modulating the amplitude of beams to produce acoustic signals.

FIG. 4 depicts the apparatus of this invention being used to produce acoustic signals by modulating the amplitude of the laser beam. Modulation computer 31 is coupled to the input of $CO_2$ laser 32, faraday rotator 35 and drive electronics 33. Array spacing computer 21 is coupled to the input of drive electronics 33 and laser 32. Computer 21 controls the spacing between successive beams in the array, i.e., it determines the sweep of the beams so that a thermoacoustic signal will be propagated in a given direction. Computer 31 modulates or determines the message that is transmitted by each of beams 7 (not shown) by modulating the pulse of the aforementioned beams. The output of drive electronics 33 is coupled to the input of steerable mirror 34. Modulator 38 comprises: faraday rotator 35; a polarizer 36 positioned to the left of rotator 35; and a polarizer 37 positioned to the right of rotator 35. When computers 21 and 31 transmit a signal to laser 32 and no signal is at the input to rotator 35, laser 32 will output a light beam that will pass through polarizer 37, rotator 35 and polarizer 36. The aforementioned light beam will be transmitted to steerable mirror 34. Mirror 34 is controlled by electronics 33 and computer 31 so that the light beam produced by laser 32 may be directed to lens 39. Lens 39 focuses the abovementioned beam to the surface of the water where the heat of the laser beam will cause the generation of an acoustic signal by causing a small layer of water at the water/air interface to expand or boil. When computer 31 transmits a signal to rotator 35, rotator 35 will rotate the plane of polarization of its input light beam 90° so that no light will be output by rotator 35 and polarizer 36. Thus, by controlling the electrical signals transmitted to rotator 35, laser 32, and the electrical signals transmitted to rotator 35, laser 32, and electronics 33 by computer 31, the beam produced by laser 32 may be modulated in amplitude. This modulated signal may be modulated to produce a coded signal or an audio signal when someone speaks into audio equipment 40 and equipment 40 transmits a signal to computer 31. When equipment 40 transmits signals to computer 31, computer 31 will transmit rhythmic output signals to rotator 35 that match the pattern of the human speech.

Figure 5:
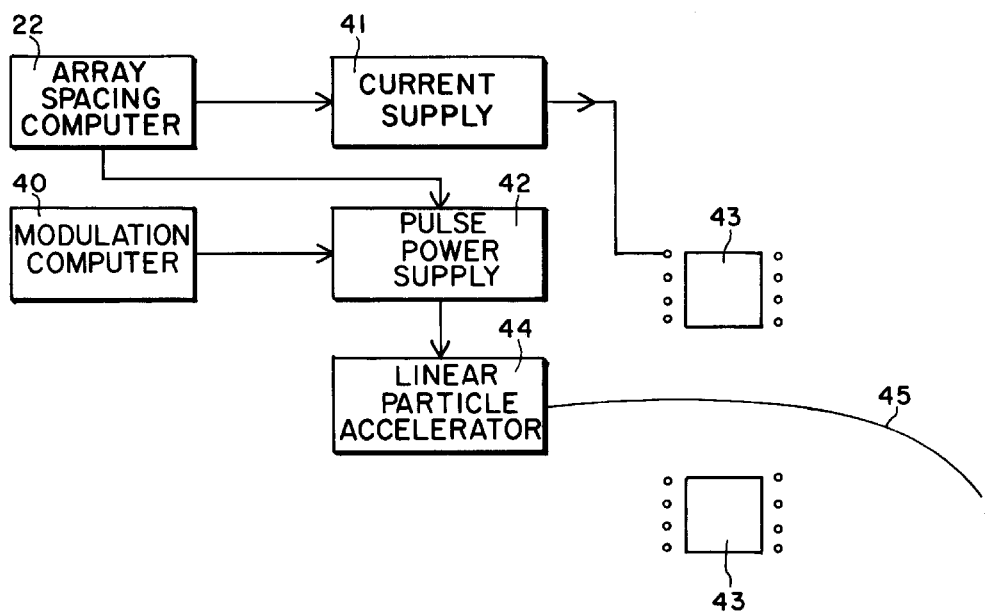
FIG. 5 is a block diagram showing an alternate embodiment of this invention that utilizes a particle accelerator for the generation of acoustic signals.

FIG. 5 shows an alternate embodiment of this invention that is used for the generation of a time multiplex code. Array spacing computer 22 is coupled to the input of current supply 41 and pulse power supply 42. Modulation computer 40 is coupled to the input of pulse power supply 42. The output of current supply 41 is coupled to the input of steering coil 43 and the output of power supply 42 is coupled to the input of linear particle accelerator 44. Computer 40 and computer 22 turn power supply 42 on and off in such a manner so that the output of power supply 42 will control the output of accelerator 42. The output of accelerator 42 will be a series of pulses of charged particles 45 that vary in time and duration. Computer 22 will control the spacing of successive beams 45, i.e., the time power supply 42 is fired and computer 40 will control the modulation of beams 45, i.e., the information of acoustic signals which may be received and decoded by a detector aboard an object beneath the surface of the water. Steering coil 43 deflects beam 45 by producing a magnetic field. The wires that comprise coil 43 run into the plane of the paper and the amount of deflection of the particles that comprise beam 45 is determined by the magnitude of the magnetic field. The greater the magnitude of the magnetic field, the greater the deflection of the particles within beam 45 and the greater the current that is supplied to coil 43. Thus, computer 45 can determine the path of beams 45 by controlling the amount of current that is supplied to coil 43.

The above specification describes a new and improved thermoacoustic sonar system. It is realized that the above description may indicate to those skilled in the art digital ways in which the principles of this invention may be used without departing from its spirit. It is, therefore, intended that this invention be limited only by the scope of the appended claims.

What is claimed is:

1. A steerable thermoacoustic array system for directing information between an object that is above the surface of the water and a sound detector that is beneath the surface of the water, said system comprising:
    means for moving a laser beam;
    a steerable movable laser located above the water's surface that produces a laser light beam having a frequency selected from a predetermined infrared range that contains information which is selectively directed to spaced-apart discrete segments of small layers of water at the air/water interface at a speed equal to the speed of sound in water divided by the steering angle of said laser, said light beam is being absorbed by the water substantially immediately adjacent the air/water interface causing the water to expand substantially immediately adjacent each of said discrete segments and produce a series of acoustic waves that constructively interfere with each other in a predetermined direction and have sufficient magnitude to travel towards and be detected by a sound detector.

2. The system claimed in claim 1 wherein said laser is a DBr laser.

3. The system claimed in claim 1 wherein said laser is a $CO_2$ laser.

4. The system claimed in claim 1 wherein said laser is a CO laser.

5. A method for directing thermoacoustic signals between an object located above the surface of the water and an object located beneath the surface of the water including the steps of:
    selectively directing and timing the production of a steerable laser beam, having a frequency selected from a predetermined infrared range, that contains information to spaced-apart discrete segments of a layer of water at the air/water interface; and
    heating said layer of water substantially immediately adjacent the air/water interface within each of said discrete segments so that said layer of water will convert the light signals which constructively interfere with each other in a predetermined direction so that said constructively interfering acoustic signals travel towards and have sufficient magnitude to be detected by a sound detector which is located in said object.

6. A steerable thermoacoustic array system for directing information between an object that is above the surface of the water and a sound detector that is beneath the surface of the water, said system comprising:
    a steerable particle beam located above the water's surface that produces a beam that contains information which is selectively directed to spaced-apart discrete segments of small layers of water at the air/water interface at a speed equal to the speed of sound in water divided by the steering angle of said beam, said beam being absorbed by the water substantially immediately adjacent the air/water interface, causing the water to expand substantially immediately adjacent each of said discrete segments and produce a series of acoustic waves that constructively interfere with each other in a predetermined direction to have sufficient magnitude to travel towards and be detected by a sound detector.

7. A steerable thermoacoustic array system for directing information from a first object located above an air/water interface to a second object located below the air/water interface, said system comprising:
    a) a laser, located in the first object, that produces a beam, having a frequency from a selected infrared range, that contains information; and
    b) means for steering said laser and for timing the production of the laser beam so that the beam produced by said laser will be directed toward and heat discrete spaced-apart small segments of a layer of water at the air/water interface, whereby a series of constructively interfering acoustic waves that travel towards and have sufficient magnitude to reach the second object will be produced substantially immediately adjacent the air/water interface.

8. The system claimed in claim 7 wherein said steering means comprises:
    a) means for moving said laser so that the beam produced by said laser will move along the surface of the water at the air/water interface; and
    b) a computer coupled to said laser and said moving means, said computer fires said laser at the proper time and controls the motion of said moving means, so that the beam produced by said laser will travel along the surface of the water at the air/water interface at a speed equal to the speed of sound in water divided by the steering angle of said laser.

9. The system claimed in claim 8 wherein said moving means, comprises:
    a) a steerable mirror which focuses on the surface of the water the beam produced by said laser, said mirror is positioned in front of the beam produced by said laser; and
    b) drive electronics coupled to said mirror and said computer, said electronics will move said mirror so that the beam produced by said laser will move along the surface of the water at a speed equal to the speed of sound in water divided by the steering angle of said laser.

10. A steerable thermoacoustic array system for directing information from a first object located above an air/water interface to a second object located below the air/water interface, said system comprising:
    a) a particle accelerator, located in the first object, that produces a beam that contains information; and
    b) means for steering said accelerator so that the beam produced by said accelerator will move along and heat discrete spaced-apart small segments of a layer of water substantially immediately adjacent the air/water interface, whereby a series of constructively interfering acoustic waves that have sufficient magnitude to travel towards and to be detected by the second object will be produced.

11. The system claimed in claim 10 wherein said steering means, comprises:
    a) means for moving said accelerator, said moving means is positioned in front of the beam produced by said accelerator so that the beam produced by said accelerator will move along the surface of the water at the air/water interface;

b) a computer coupled to said accelerator and said moving means, said computer fires said accelerator at the proper time and controls the motion of said moving means, so that the beam produced by said accelerator will travel along the surface of the water at the air/water interface at a speed equal to the speed of sound in water divided by the steering angle of said accelerator.

12. The system claimed in claim 11 wherein said moving means, comprises:

a) a power supply coupled to said computer, said power supply produces an electric current; and b) a coil coupled to said power supply, said coil produces a magnetic field that deflects the beam produced by said accelerator.

\* \* \* \* \*